(12) United States Patent
Lucas

(10) Patent No.: US 9,731,741 B1
(45) Date of Patent: Aug. 15, 2017

(54) COLLAPSIBLE CART

(71) Applicant: Yolanda Lorraine Lucas, Halls Creek (AU)

(72) Inventor: Yolanda Lorraine Lucas, Halls Creek (AU)

( * ) Notice: Subject to any disclaimer, the term of this patent is extended or adjusted under 35 U.S.C. 154(b) by 0 days.

(21) Appl. No.: 15/277,045

(22) Filed: Sep. 27, 2016

(51) Int. Cl.
*B62B 3/02* (2006.01)
*B62B 3/08* (2006.01)

(52) U.S. Cl.
CPC ............ *B62B 3/027* (2013.01); *B62B 3/022* (2013.01); *B62B 3/08* (2013.01); *B62B 2205/12* (2013.01); *B62B 2205/30* (2013.01)

(58) Field of Classification Search
CPC ....... B62B 3/02; B62B 2202/404; B62B 3/12; B62B 1/12; B62B 2205/20; B62B 3/027; B62L 33/027
See application file for complete search history.

(56) References Cited

U.S. PATENT DOCUMENTS

| | | | |
|---|---|---|---|
| 3,534,973 A | 10/1970 | Elliott | |
| 4,765,644 A | 8/1988 | Bell | |
| 7,168,715 B1 | 1/2007 | Friedman | |
| 8,567,809 B2 | 10/2013 | White et al. | |
| 9,050,988 B1 | 6/2015 | McLeod | |
| 2003/0197339 A1 | 10/2003 | D'Angelo | |
| 2011/0156375 A1* | 6/2011 | Gal | B62B 3/027 280/651 |

FOREIGN PATENT DOCUMENTS

JP         2012006492 A  *  1/2012

* cited by examiner

*Primary Examiner* — John Walters
*Assistant Examiner* — James Triggs
(74) *Attorney, Agent, or Firm* — Dunlap Bennett & Ludwig PLLC

(57) ABSTRACT

A collapsible cart having a frame that extends from a handle to an opposing wheel housing is provided. The wheel housing may provide a plurality of wheel, each wheel independently movable between a folded condition nested therein and an extended condition operably protruding from the wheel housing so that a user manipulating the handle steers the collapsible cart along a supporting surface. A plurality of collapsible brackets and crates may be provided along the frame so as to be movable between an operable configuration for transporting objects and a collapsed configuration for storage of the collapsible cart.

6 Claims, 3 Drawing Sheets

COLLAPSIBLE CART

BACKGROUND OF THE INVENTION

The present invention relates to grocery carts and, more particularly, a collapsible cart.

Transporting groceries, documents and other goods efficiently and safely from point A to B would be a boon for individual regardless of the task. Current mobile carts, however, are inconveniently bulky, do not allow flexibility to the users, and are not fully developed for various daily uses as they do not accommodate daily functional devices.

As can be seen, there is a need for a collapsible shopping cart that is lightweight and useful for everyday functioning regardless of the task at hand. Thereby, making transporting products (and shopping) very convenient for the user. The present invention is also ecologically helpful by reducing the reliance on shopping bags.

SUMMARY OF THE INVENTION

In one aspect of the present invention, a collapsible cart includes an elongated frame extending between a handle end and a wheel end; a handle connected to the wheel end; a wheel housing connected to the wheel end, wherein the wheel housing defines a compartment space; a plurality of legs pivotally connected in the compartment space so that each leg is movable between a folded condition and an extended condition protruding from the compartment space; and a plurality of spaced apart brackets pivotally connected along the elongated frame so each bracket is independently movable between an operable condition generally perpendicular to a longitudinal axis of the elongated frame and a collapsed condition parallel to the longitudinal axis.

In another aspect of the present invention, the collapsible cart includes an elongated frame extending between a handle end and a wheel end; a handle connected to the wheel end; a wheel housing connected to the wheel end, wherein the wheel housing defines a compartment space; a plurality of legs pivotally connected in the compartment space so that each leg is movable between a folded condition and an extended condition; a first pivotal connection interconnecting the compartment space and a proximal end of each of the plurality of legs; a second pivotal connection provide at a midpoint of each of the plurality of legs; a wheel rotatably connected to a distal end of each of the plurality of legs so that each wheel operably protrudes from the compartment space when its respective leg is in the extended condition; a plurality of spaced apart brackets pivotally connected along the elongated frame so each bracket is independently movable between an operable condition generally perpendicular to a longitudinal axis of the elongated frame and a collapsed condition parallel to the longitudinal axis, wherein each bracket forms an L-shape having a peripheral wall defining an uppercase profile depth and a lowercase profile depth; and a collapsible crate removably secured by each of the plurality of brackets, wherein each collapsible crate is movable between an operable condition and a collapsed condition, and wherein the collapsible condition nests into the lowercase profile depth so as to not protrude therefrom.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a collapsible cart having a frame that extends from a handle to an opposing wheel housing. The wheel housing may provide a plurality of wheel, each wheel independently movable between a folded condition nested therein and an extended condition operably protruding from the wheel housing so that a user manipulating the handle steers the collapsible cart along a supporting surface. A plurality of collapsible brackets and crates may be provided along the frame so as to be movable between an operable configuration for transporting objects and a collapsed configuration for storage of the collapsible cart.

Referring now to FIGS. 1 through 4, the present invention may include a collapsible cart 100 having an elongated frame 26 that extends from a handle end to a housing end. The frame 26 may be made of material that can be repeatedly subject to bending and compression stresses without fracturing, such as various impregnated or laminated fibrous materials, various plasticized materials and the like.

A handle 10 may be connected to the handle end of the frame 26, wherein the handle 10 is dimensioned and adapted for manipulating the orientation of and rotating the frame 26 about its longitudinal axis for steering and transportation purposes. A plurality of hooks 12 adapted for removably connecting objects may be located along the handle 10 and/or the frame 26, typically near the handle end.

Figure 1:
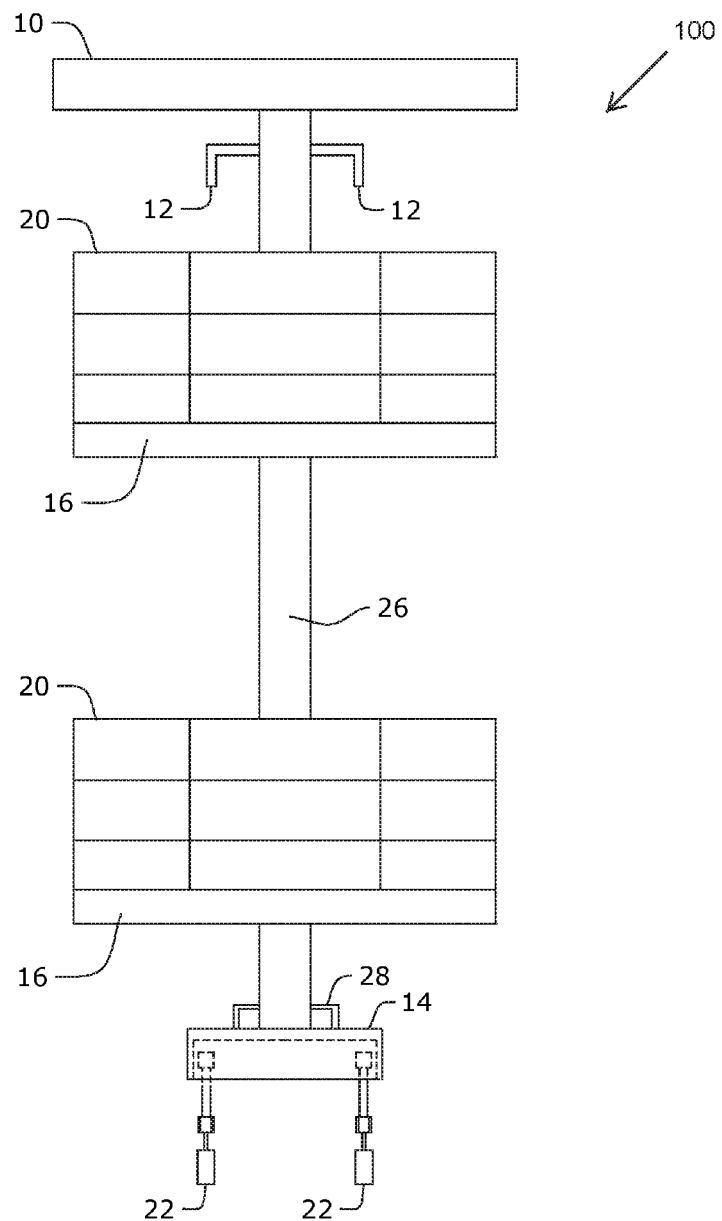
FIG. 1 is a front elevation view of an exemplary embodiment of the present invention.
Figure 2:
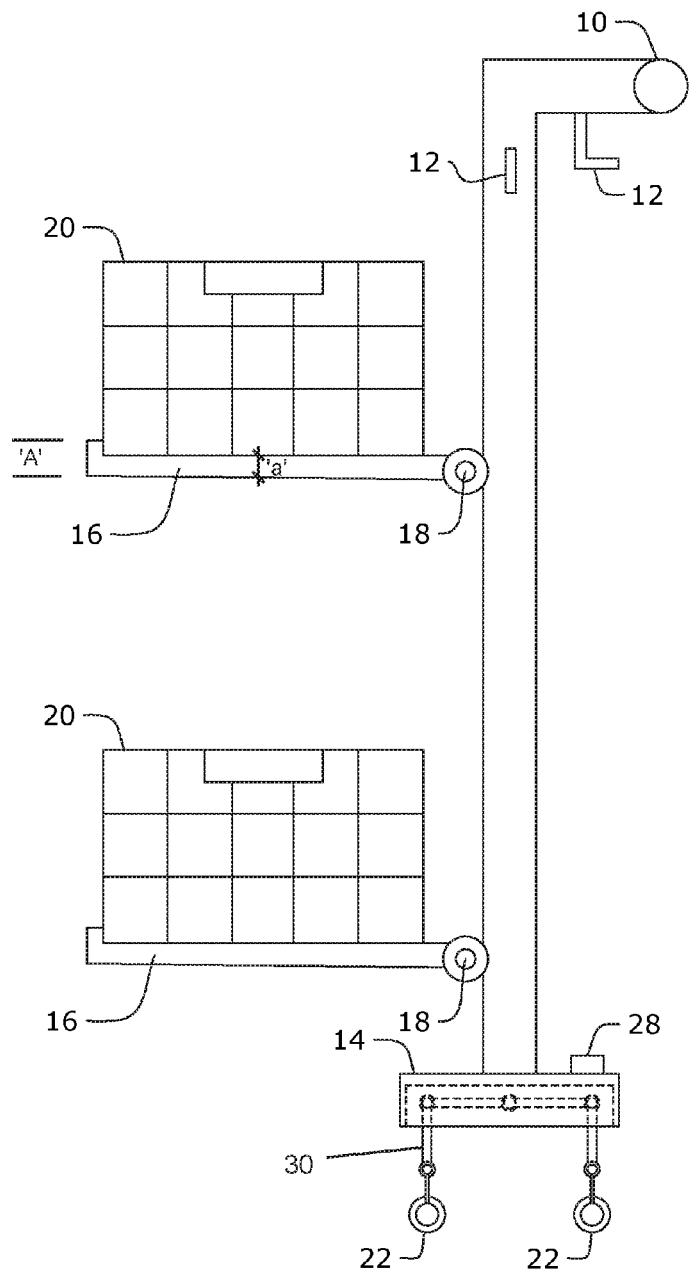
FIG. 2 is a side elevation view of an exemplary embodiment of the present invention.
Figures 3, 4:
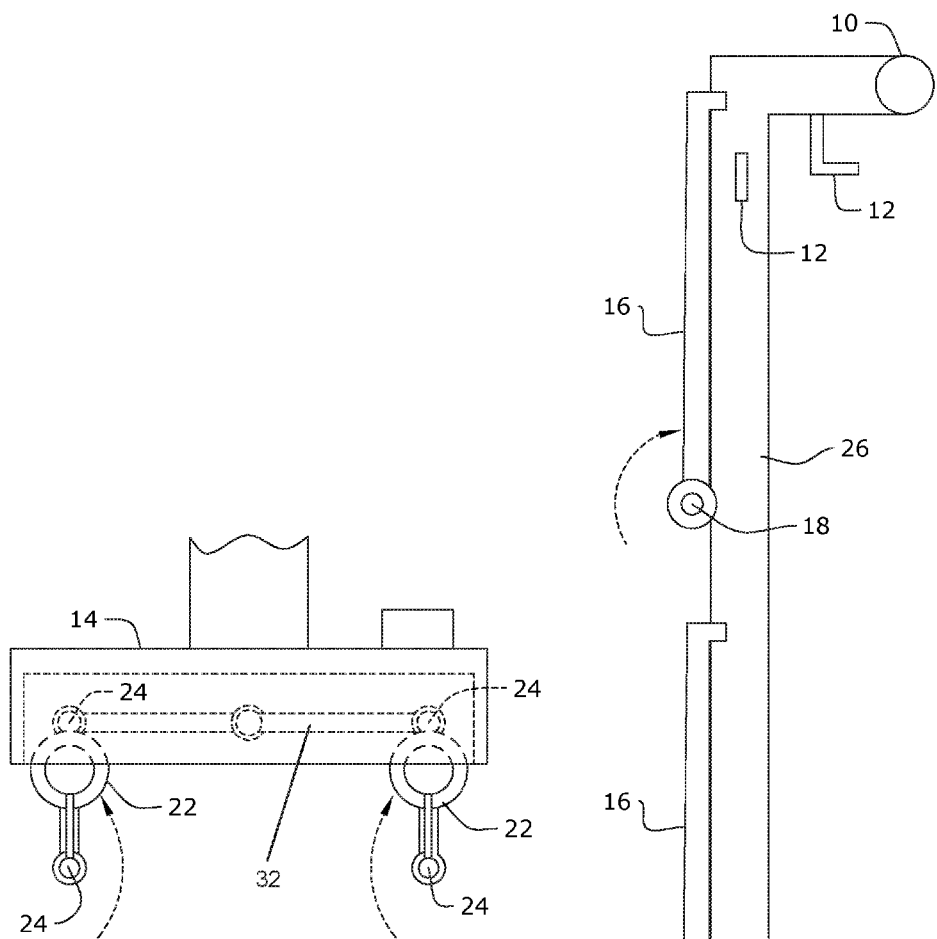
FIG. 3 is a detailed side view of an exemplary embodiment of the present invention of the wheel housing.
FIG. 4 is a side elevation view of an exemplary embodiment of the present invention, shown in a collapsed configuration.

A plurality of brackets 16 may be pivotally connected along the elongated frame 26 by way of pivotal connections 18 (hinges for example) so that each bracket 16 may move between an operable condition and a collapsed condition. In the collapsed condition, the brackets 16 may be adjacent to and parallel with the longitudinal axis of the elongated frame 26, as illustrated in FIG. 4. In the operable condition, the brackets 16 may extend approximately perpendicular to the elongated frame 26, as illustrated in FIG. 2. Each bracket 16 may generally form a L-shape having an uppercase profile depth 'A' and a lowercase profile depth 'a', as illustrated in FIG. 2. Each bracket 16 may have a peripheral wall along the base and extended legs so as to define the uppercase and lowercase depths, respectively.

In the operable condition, each bracket 16 may be dimensioned and adapted to support a collapsible crate 20. Each collapsible crate 20 may be movable between an operable state and a collapsed state. In the collapsed state, each collapsible crate 20 may collapse so as to nest into the uppercase and/or lowercase profiles, 'A' and/or 'a,' of its respective bracket 16, as illustrated in FIG. 4, shown in with the bracket 16 in the collapsed condition and the respective collapsible crate 20 in the collapsed state. Alternatively, each collapsible crate 20 may be removed from the plurality of brackets 16 for facilitating the collapsed condition of the latter.

A wheel housing 14 may be connected to the housing end of the frame 26. The wheel housing 14 may form a compartment space providing at least one rail 32 therein. Each wheel 22 of a plurality of wheels 22 may be interconnected to the at least one rail 32 by a leg 30. Each leg 30 may provide a pivotal connection 24 at a distal end wherein it attaches to the at least one rail 32 and near its midpoint so that each leg 30 is movable from an extended condition to a folded condition by way of a user engaging a folding mechanism 28. In the folded condition, the plurality of wheels 22 do not protrude from the compartment space, as illustrated in FIG. 4, facilitating easy storage without concern of the present invention rolling on the plurality of wheels 22. In the extended condition, FIGS. 1 and 2, the plurality of wheels 22 may protrude from the compartment so as to be operable along a supporting surface, while a user manipulates the handle 10. As each wheel 22 moves from the extended condition to the folded condition it may be disposed in a half-folded condition as it pivots about the midpoint pivotal connection 24, as illustrated in FIG. 3.

A method of using the present invention may include the following. The collapsible cart 100 disclosed above may be provided. A user may manipulate the handle 10 so as to steer the collapsible cart 100 along its plurality of wheels 22 in the extended condition. The user would place their goods in the collapsible crate(s) 20 in the operable state on the brackets 16 in the operable condition, thereby eliminating the wastefulness of using grocery or shopping bags. Then the user may roll the collapsible cart 100 home. At home, after unloading their goods, the user may move the brackets 16 and crates 20 into their respective collapsed condition and state, fold the plurality of wheels into the folded condition, and so store the collapsible cart 100 conveniently in a collapsed configuration.

It should be understood, of course, that the foregoing relates to exemplary embodiments of the invention and that modifications may be made without departing from the spirit and scope of the present invention.

What is claimed is:

1. A device, comprising:
   an elongated frame extending between a handle end and a wheel end;
   a handle connected to the wheel end;
   a wheel housing connected to the wheel end, wherein the wheel housing defines a compartment space;
   a plurality of legs pivotally connected in the compartment space so that each leg is movable between a folded condition and an extended condition protruding from the compartment space;
   a plurality of spaced apart brackets pivotally connected along the elongated frame so each bracket is independently movable between an operable condition generally perpendicular to a longitudinal axis of the elongated frame and a collapsed condition parallel to the longitudinal axis; and
   a wheel rotatably connected to a distal end of each of the plurality of legs so that each wheel operably protrudes from the compartment space when its respective leg is in the extended condition, wherein each proximal end of each leg provides a first pivotal connection connected in the compartment space, and wherein each of the plurality of legs provides a second pivotal connection near its midpoint for facilitating the folded condition wherein each respective wheel does not protrude from the compartment space.

2. The device of claim 1, further comprising a collapsible crate removably secured by each of the plurality of brackets.

3. The device of claim 2, wherein each collapsible crate is movable between an operable condition and a collapsed condition.

4. The device of claim 3, wherein each bracket forms an L-shape having a peripheral wall defining an uppercase profile depth and a lowercase profile depth.

5. The device of claim 3, wherein the collapsible condition nests into the lowercase profile depth so as to not protrude therefrom.

6. A device, comprising:
   an elongated frame extending between a handle end and a wheel end;
   a handle connected to the wheel end;
   a wheel housing connected to the wheel end, wherein the wheel housing defines a compartment space;
   a plurality of legs pivotally connected in the compartment space so that each leg is movable between a folded condition and an extended condition;
   a first pivotal connection interconnecting the compartment space and a proximal end of each of the plurality of legs;
   a second pivotal connection provide at a midpoint of each of the plurality of legs;
   a wheel rotatably connected to a distal end of each of the plurality of legs so that each wheel operably protrudes from the compartment space when its respective leg is in the extended condition;
   a plurality of spaced apart brackets pivotally connected along the elongated frame so each bracket is independently movable between an operable condition generally perpendicular to a longitudinal axis of the elongated frame and a collapsed condition parallel to the longitudinal axis, wherein each bracket forms an L-shape having a peripheral wall defining an uppercase profile depth and a lowercase profile depth; and
   a collapsible crate removably secured by each of the plurality of brackets, wherein each collapsible crate is movable between an operable condition and a collapsed condition, and wherein the collapsible condition nests into the lowercase profile depth so as to not protrude therefrom.

* * * * *